(12) United States Patent
Cinpinski et al.

(10) Patent No.: US 8,056,516 B2
(45) Date of Patent: Nov. 15, 2011

(54) VARIABLE VALVE LIFT TRANSITION CONTROL METHODS AND SYSTEMS

(75) Inventors: Kenneth J. Cinpinski, Ray, MI (US); Donovan L. Dibble, Utica, MI (US); Alexander J. Roberts, Commerce Township, MI (US); Vimesh M. Patel, Novi, MI (US)

(73) Assignee: GM Global Technology Operations LLC

( * ) Notice: Subject to any disclaimer, the term of this patent is extended or adjusted under 35 U.S.C. 154(b) by 652 days.

(21) Appl. No.: 12/178,989

(22) Filed: Jul. 24, 2008

(65) Prior Publication Data

US 2009/0101091 A1    Apr. 23, 2009

Related U.S. Application Data

(60) Provisional application No. 60/981,275, filed on Oct. 19, 2007.

(51) Int. Cl.
*F01L 1/34*    (2006.01)
(52) U.S. Cl. .............. 123/90.15; 123/90.17; 464/160
(58) Field of Classification Search ........... 123/90.15, 123/90.16, 90.17, 90.18; 464/1, 2, 160
See application file for complete search history.

(56) References Cited

U.S. PATENT DOCUMENTS 6,814,052 B2 * 11/2004 Weiss et al. ............... 123/350
6,973,901 B2 * 12/2005 Machida ................... 123/90.16

* cited by examiner

*Primary Examiner* — Ching Chang

(57) ABSTRACT

A system for controlling a variable valve lift system of an engine comprises a delay module that estimates a total delay based on at least one of a measured and an estimated delay of the variable valve lift system. A variable valve control module commands one of a first transition from a variable valve low-lift profile to a variable valve high-lift profile and a second transition from a variable valve high-lift profile to a variable valve low-lift profile based on the total delay.

22 Claims, 5 Drawing Sheets

VARIABLE VALVE LIFT TRANSITION CONTROL METHODS AND SYSTEMS

CROSS-REFERENCE TO RELATED APPLICATIONS

This application claims the benefit of U.S. Provisional Application No. 60/981,275, filed on Oct. 19, 2007. The disclosure of the above application is incorporated herein by reference.

FIELD

The present disclosure relates to methods and systems for controlling variable valve actuation systems.

BACKGROUND

The statements in this section merely provide background information related to the present disclosure and may not constitute prior art.

Intake valves control the entry of an air/fuel mixture into cylinders of an internal combustion engine (ICE). Exhaust valves control the exit of gases from the cylinders of an internal combustion engine. Camshaft lobes (or "cam lobes") on a camshaft push against the valves to open the valves as the camshaft rotates. Springs on the valves return the valves to a closed position. The timing, duration, and degree of the opening, or "valve lift," of the valves can impact performance.

Variable valve actuation (VVA) technology improves fuel economy, engine efficiency, and/or performance by modifying the valve event lift, timing, and duration as a function of engine operating conditions. Two-step VVA systems enable two discrete valve events on the intake and/or exhaust valves. The engine control module (ECM) selects the optimal valve event profile that is best utilized for each engine operating condition.

An issue in the development and application of VVA system is the response time variability of the control system and hardware. A limited amount of time is available for switching a Switching Roller Finger Follower (SRFF) between engaging and disengaging. If the control valve causes a fluid pressure change in a lifter fluid gallery to occur too soon relative to a valve lift curve, a SRFF arm lock pin may only partially engage and then disengage after the valve has started lifting. This unscheduled disengagement may cause the engine valve to drop from the high-lift valve event to the low-lift valve event, or on to the valve seat. After a number of such events, the SRFF arm or the valve may show signs of accelerated wear or damage.

SUMMARY

Accordingly, a system for controlling a variable valve lift system of an engine, comprises a delay module that estimates a total delay based on at least one of a measured and an estimated delay of the variable valve lift system. A variable valve control module commands one of a first transition from a variable valve low-lift profile to a variable valve high-lift profile and a second transition from a variable valve high-lift profile to a variable valve low-lift profile based on the total delay.

In other features, the variable valve control module commands the first transition and the second transition based on a range of crankshaft angular positions that is adjusted based on the total delay. The range is defined by a maximum crankshaft angular position and a minimum crankshaft angular position, and wherein the variable valve control module adjusts the range by subtracting the total delay from at least one of the maximum crankshaft angular position and the minimum crankshaft angular position.

In other features, an engine control module controls one of throttle position, spark timing, and camshaft phaser movement based on the first transition from the variable valve low-lift profile to the variable valve high-lift profile. The engine control module adjusts the control of the at least one of the throttle position, the spark timing, and the camshaft phaser movement prior to the first transition from the variable valve low-lift profile to the variable valve high-lift profile.

In other features, an engine control module controls engine torque based on the second transition from the variable valve high-lift profile to the variable valve low-lift profile. The engine control module controls engine torque after the second transition from the variable valve high-lift profile to the variable valve low-lift profile.

In other features, the variable valve control module commands the first transition from the variable valve low-lift profile to the variable valve high-lift profile and the second transition from the variable valve high-lift profile to the variable valve low-lift profile based on a desired engine torque.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
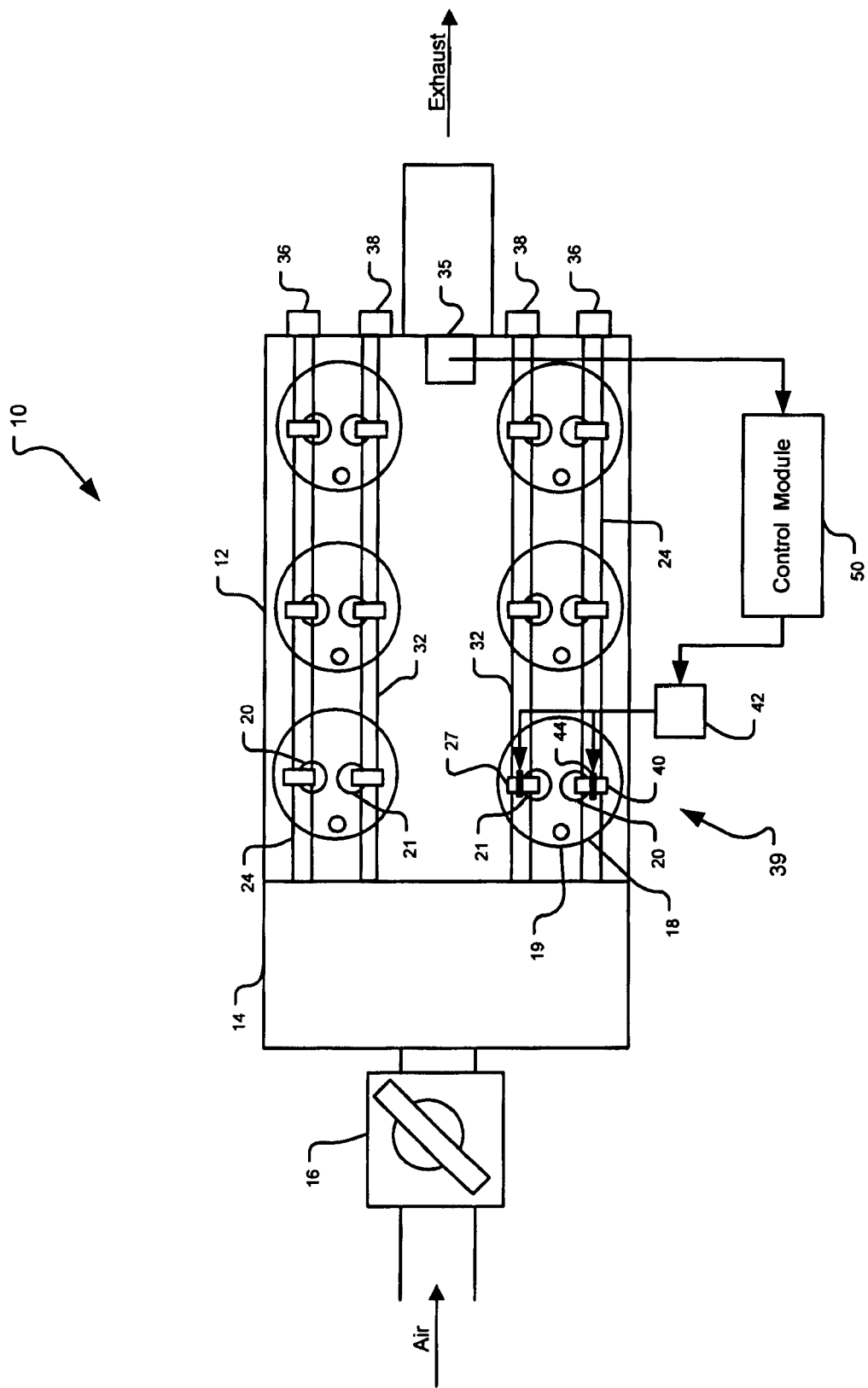
FIG. 1 is a functional block diagram of an exemplary six-cylinder engine including a variable valve lift (VVL) system according to various aspects of the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an engine system 10 includes an engine 12 that combusts an air/fuel mixture to produce drive torque. Air is drawn into an intake manifold 14 through a throttle 16. The throttle 16 regulates air flow into the intake manifold 14. Air within the intake manifold 14 is distributed into cylinders 18. Although six cylinders are illustrated, the engine 12 may include additional or fewer cylinders 18. For example, engines having 2, 3, 4, 5, 8, 10, and 12 cylinders are contemplated. Although FIG. 1 depicts the cylinders in a v-shaped configuration, it is appreciated that the cylinders 18 can be implemented in an inline configuration. A fuel injector 19 injects fuel that is combined with air as it is drawn into the cylinder 18. A fuel injection system (not shown) regulates (timing, amount, etc.) the fuel injector 19 to provide a desired air-to-fuel ratio within each cylinder 18.

According to an exemplary embodiment of the present disclosure, each cylinder 18 may include an intake valve 20 and an exhaust valve 21. The intake valve 20 selectively opens and closes to enable the air and/or air/fuel mixture to enter the cylinders 18. Intake camshafts 24 regulate intake valve open and close events. The exhaust valves 21 selectively open and close to enable the exhaust to exit the cylinders 18. Exhaust valve open and close events are regulated by exhaust camshafts 32. Although a single intake valve 20 and a single exhaust valve 21 are shown per cylinder 18, multiple intake valves and multiple exhaust valves can be configured per cylinder 18.

A piston (not shown) compresses the air/fuel mixture within the cylinder 18. A spark plug (not shown) initiates combustion of the air/fuel mixture. The piston drives a crankshaft (not shown) to produce drive torque. The crankshaft drives the intake and exhaust camshafts 24, 32 using a timing chain (not shown). It is appreciated that dual intake camshafts and dual exhaust camshafts may be implemented. An engine speed sensor 35 generates an engine speed signal indicating the rotational speed of the engine 12 in revolutions per minute (RPM).

The engine 12 may include intake cam phasers 36 and exhaust cam phasers 38 that adjust the rotational timing of the intake and exhaust camshafts 24, 32, respectively. More specifically, a phase angle of the intake and exhaust cam phasers 36, 38 may be retarded or advanced to control relative timing of the intake and exhaust camshafts 24, 32.

A variable valve (VVL) system 39 interacts with the camshafts 24, 32 to regulate valve open and close events. The VVL system 39 includes a plurality of switching roller finger followers (SRFFs) 40. Each SRFF 40 includes a low-lift contact that interfaces with a low-lift cam lobe (not shown) affixed to the camshafts 24, 32 and one or more high-lift contacts (not shown) that interface with one or more high-lift cams lobes (not shown) affixed to the camshafts 24, 32. As the camshafts 24, 32 rotate, the cam lobes contact the SRFFs 40 which, in turn, open and close the respective valve or valves 20, 21. Each SRFF 40 is controlled such that the valves 20, 21 are selectively operated according to at least one of a low-lift profile and a high-lift profile. In particular, pressurized fluid is supplied by a solenoid operated valve 42 to the SRFF 40 to release and/or engage a locking pin 44. The locking pin 44 serves to activate and deactivate the low-lift contact and/or the high-lift contact.

A control module 50 controls the supply of pressurized fluid to each SRFF 40 system to engage and disengage the locking pins 44. In particular, the control module 50 commands the supply of fluid pressure such that inadvertent locking pin disengagement does not occur. In various embodiments, the control module 50 schedules the transition between the high-lift profile and the low-lift profile by: first computing a current time delay in degrees of crankshaft rotation; and, then, applying the time delay to known locations where an incomplete locking pin engagement is feasible to determine a crankshaft angular position where the command should be initiated. The command is then initiated at that time to eliminate the undesirable, unscheduled, disengagements and their associated audibles.

Figure 2:
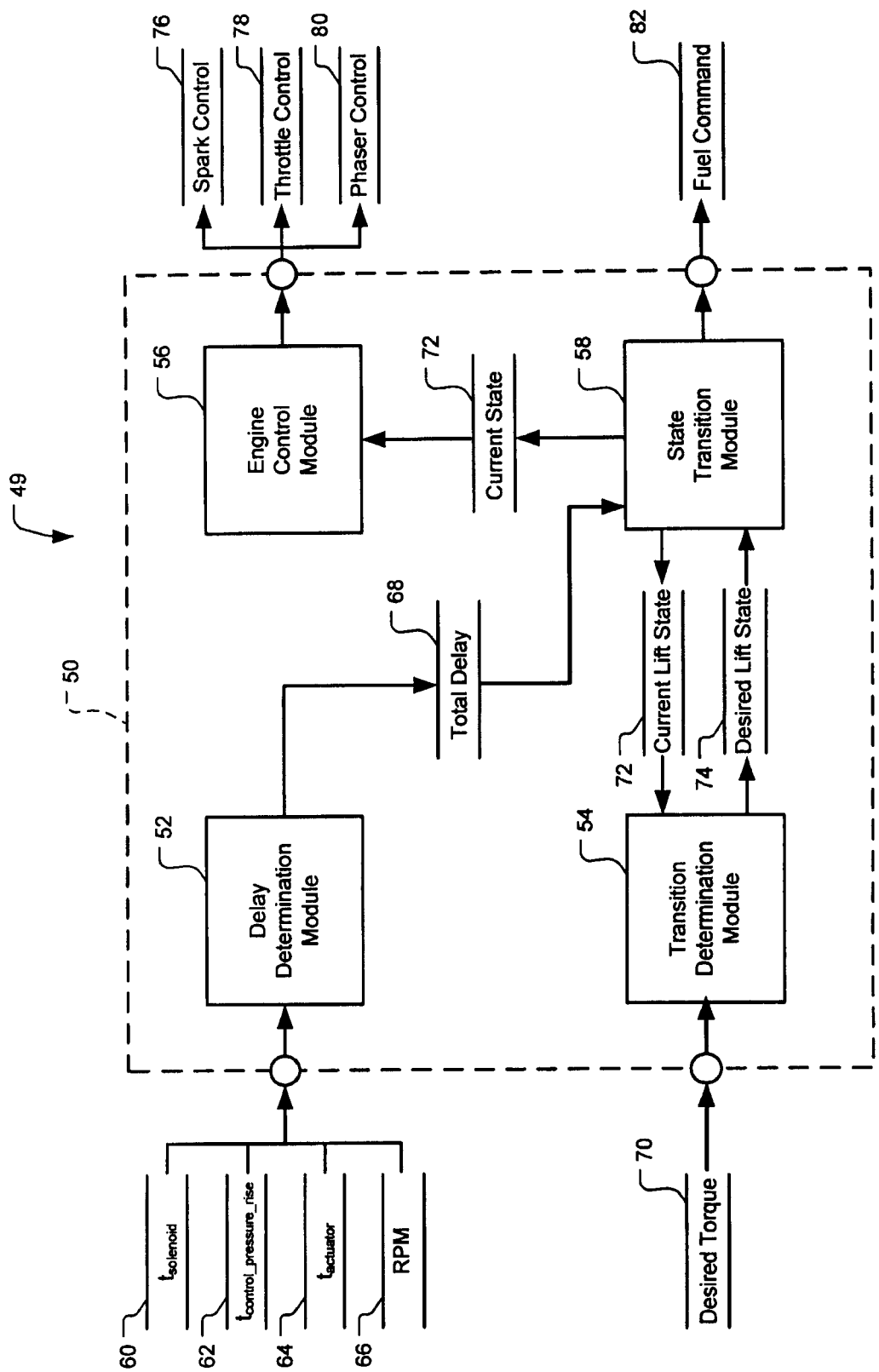
FIG. 2 is a dataflow diagram illustrating an exemplary VVL control system according to various aspects of the present disclosure.

Referring now to FIG. 2, a VVL control system 49 is shown that may be embedded within the control module 50. Various embodiments of VVL control systems 49 according to the present disclosure may include any number of sub-modules embedded within the control module 50. As can be appreciated, the sub-modules shown may be combined and/or further partitioned to similarly control the VVL system 39 and/or other engine components. Inputs to the VVL control system 49 may be sensed from the engine system 10 (FIG. 1), received from other control modules (not shown), and/or determined by other sub-modules (not shown) within the control module 50. In various embodiments, the control module 50 of FIG. 2 includes a delay determination module 52, a transition determination module 54, a state transition module 58, and an engine control module 56.

The delay determination module 52 estimates a total time delay 68 based on measured and/or estimated time delays associated with the hardware involved in controlling the VVL system 39 (FIG. 1). In various embodiments, the delay determination module 52 estimates a total time delay 68 based on a time delay associated with the control solenoid ($t_{solenoid}$), a time delay associated with the pressure rise ($t_{control\_pressure\_rise}$), and a time delay associated with the actuator ($t_{actuator}$). In various embodiments, the total time delay 68 can be estimated based on the following equation:

$$t_{delay} = t_{solenoid} + t_{control\_pressure\_rise} + t_{actuator}. \qquad (1)$$

The control solenoid time delay ($t_{solenoid}$) can be estimated as a function of voltage (V) and oil temperature ($T_{oil}$), as shown as:

$$t_{solenoid} = f(V, T_{oil}). \qquad (2)$$

The control pressure rise time delay ($t_{control\_pressure\_rise}$) can be estimated as a function of oil supply pressure ($P_{supply}$) and oil temperature ($T_{oil}$), as shown as:

$$t_{control\_pressure\_rise} = f(P_{supply}, T_{oil}). \qquad (3)$$

The actuator time delay ($t_{actuator}$) can be estimated as a function of control pressure ($P_{control}$) and oil temperature ($T_{oil}$), as shown as:

$$t_{actuator} = f(P_{control}, T_{oil}). \qquad (4)$$

Based on the total time delay 68 and a current engine speed (RPM) 66, the delay determination module 52 converts the total time delay 68 to degrees of crankshaft rotation. In various embodiments, the total time delay 68 can be converted to degrees of crankshaft rotation ($Deg_{delay}$) based on the following equation:

$$Deg_{delay} = 360 * \left[ \frac{RPM}{120} (t_{delay})^2 + \frac{RPM}{60} (t_{delay}) \right]. \qquad (5)$$

The transition determination module 54 estimates whether a transition between a low-lift profile and a high-lift profile is desired based on a current lift state 72 and a desired torque 70. For example, the transition determination module 54 estimates that a transition from a low-lift profile to a high-lift profile is desired (desired lift state 74) when the current lift state 72 is the low-lift state and the desired torque 70 is greater than a low-lift torque threshold. In another example, the transition determination module 54 projects that a transition from a high-lift profile to a low-lift profile is desired (desired lift state 74) when the current lift state 72 is the high-lift state and the desired torque 70 is less than a high-lift torque threshold. In various embodiments, the desired torque 70 can be estimated based on engine operating parameters.

The state transition module 58 schedules the transition based on the desired lift state 74 and commands the pressurized fluid via a fluid command 82 at the scheduled time such that the transition occurs. In various embodiments, the transition is scheduled by subtracting the total time delay 68 in crankshaft degrees from known locations, in crankshaft degrees, where an incomplete pin engagement is feasible. Such known locations can be predetermined and/or estimated real-time based on engine performance.

The engine control module 56 controls one or more components of the engine system (FIG. 1) based on the current lift state 72. The engine control module 56 controls the one or more components to prepare the engine 12 (FIG. 1) for the transitions between the low-lift profile and the high-lift profile. In various embodiments, the engine control module 56 controls at least one of the throttle 16 (FIG. 1), the cam phasers 36, 38 (FIG. 1), and the spark (not shown) via control signals 78, 70 and 76, respectively, before the fluid and, thus, the state transition is commanded. In various embodiments, the engine control module 56 controls engine torque by performing one or more torque smoothing methods known in the art after the fluid and, thus, the state transition is commanded.

Figure 3:
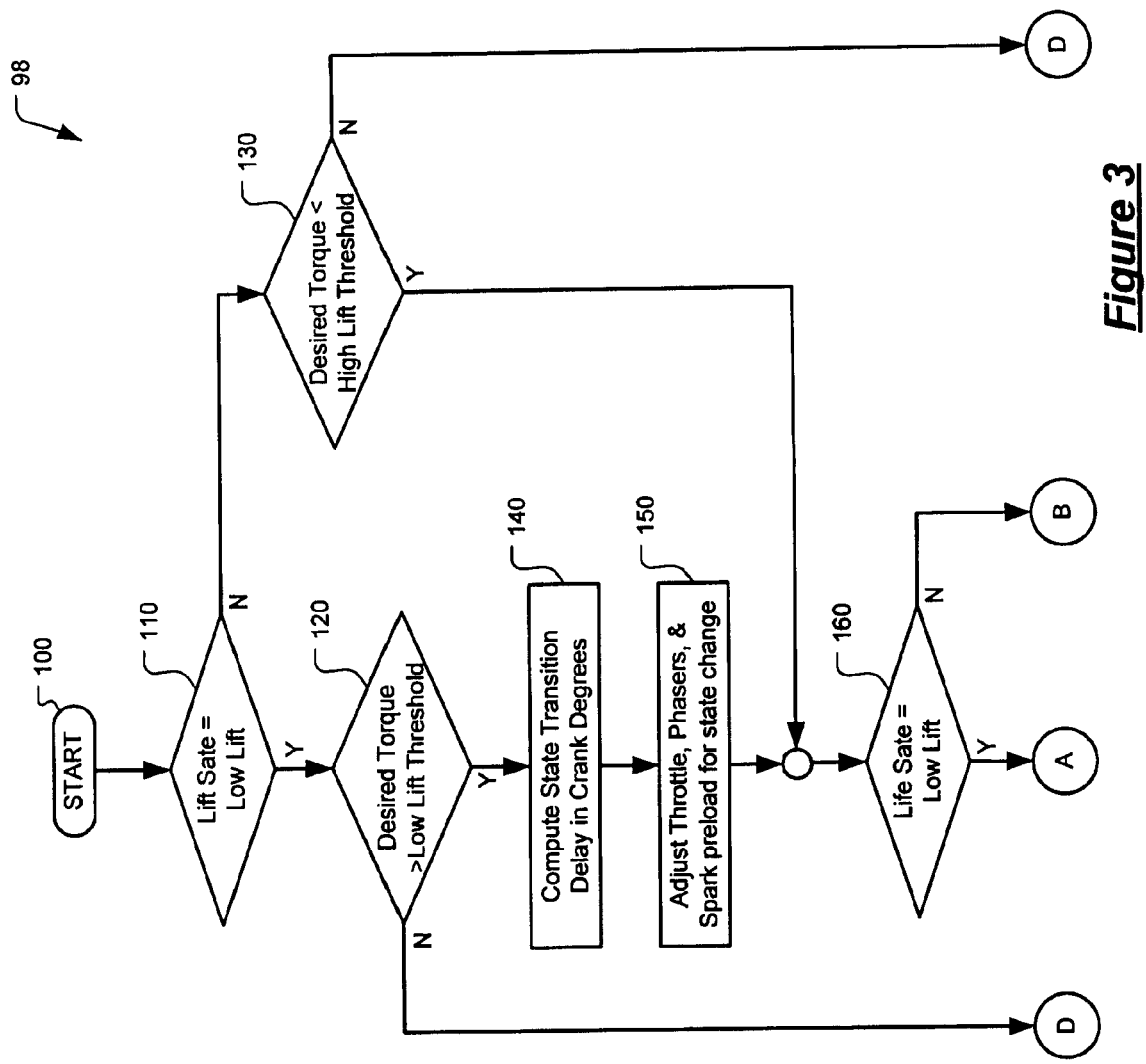
FIGS. 3 through 5 are flowcharts illustrating an exemplary VVL control method according to various aspects of the present disclosure.
Figure 4:
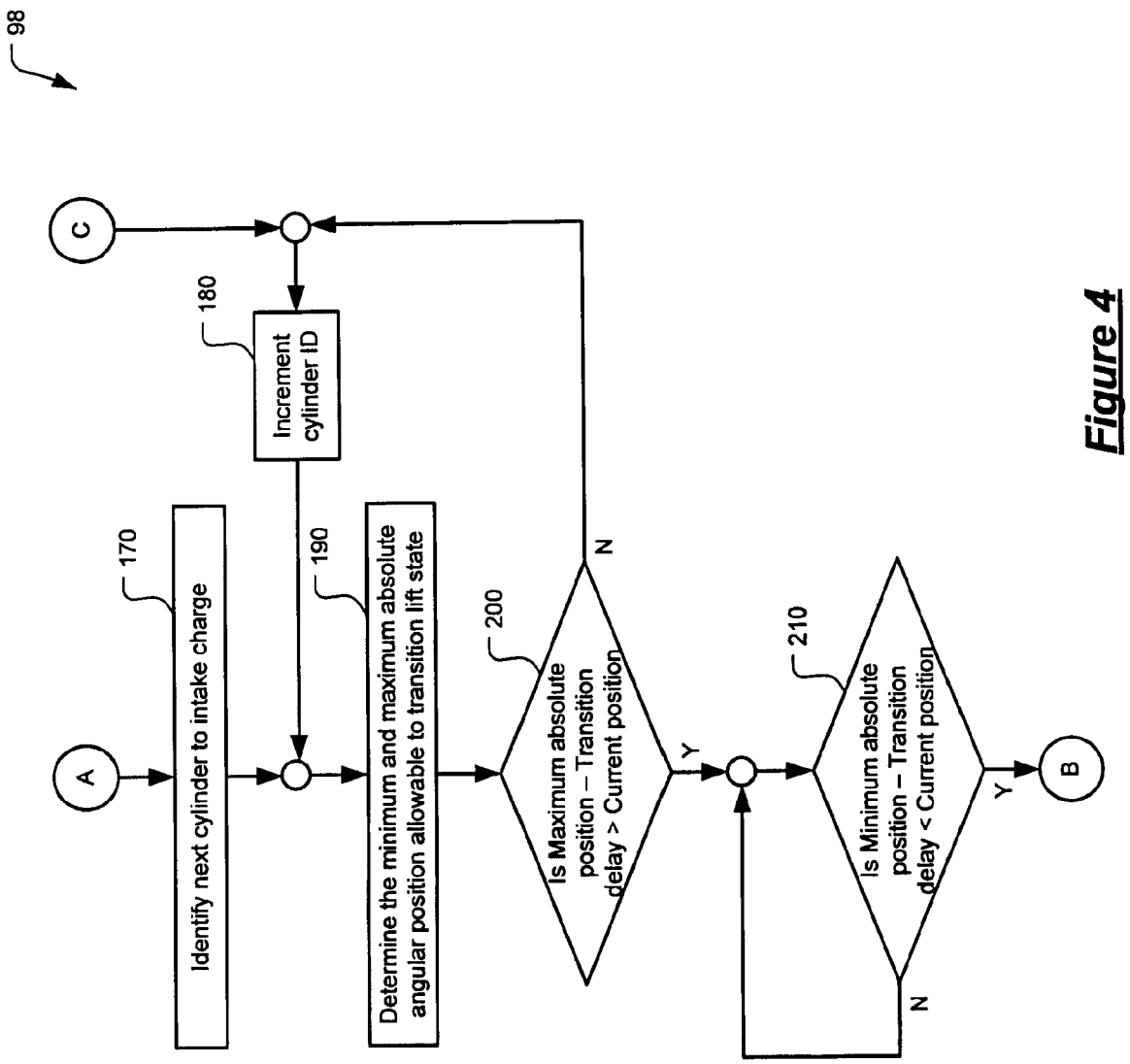
Figure 5:
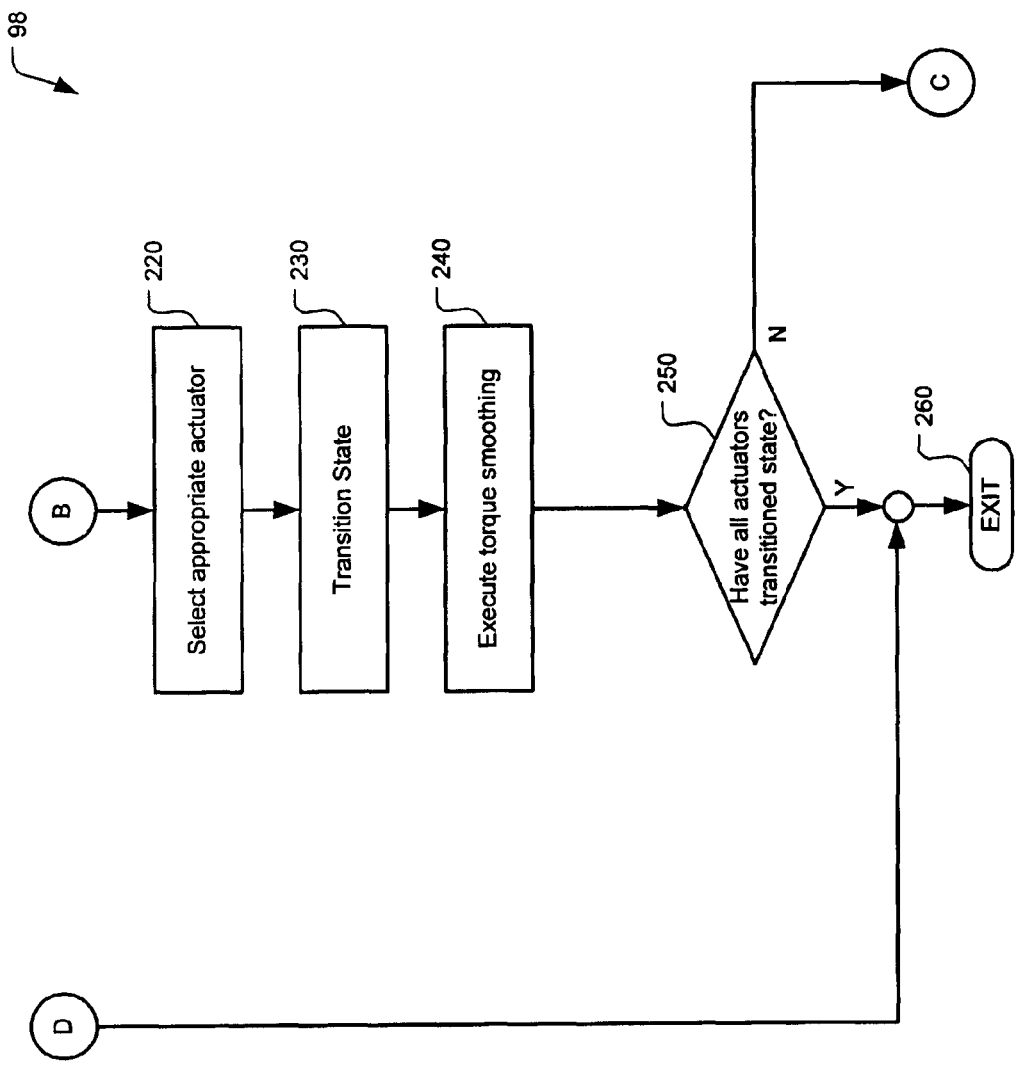

Referring now to FIGS. 3 through 5, flowcharts illustrate a VVL control method 98 that can be performed by the VVL control system 49 of FIG. 2 in accordance with various aspects of the present disclosure. As can be appreciated, the order of execution of the steps of the VVL control method 98 can vary without altering the spirit of the method. The VVL control method 98 may be performed periodically during control module operation or scheduled to run based on certain events. The method may begin at 100.

The current lift state 72 and the desired torque 70 are evaluated at 110, 120, and 130. If the current lift state 72 is the low-lift state at 110, and the desired torque 70 is greater than a low-lift torque threshold at 120, the total time delay 68 is computed in crankshaft degrees at 140 (as discussed above); and the throttle 16 (FIG. 1), cam phasers 36, 38 (FIG. 1), and spark (not shown) are adjusted for the state change at 150 (as discussed above). If, however, the current lift state 72 is the low-lift state at 110 and the desired torque 70 is less than or equal to the low-lift torque threshold at 120, a transition is not desired and the method may end at 260.

If the current lift state 72 is the high-lift state (not equal to the low-lift state) at 110, and the desired torque 70 is less than a high-lift torque threshold at 130, control proceeds to evaluate again the current lift state 72 at 160. Otherwise, if the current lift state 72 is the high-lift state at 110, and the desired torque 70 is greater than or equal to the high-lift torque threshold at 130, a transition is not desired and the method may end at 260.

At 160, once a transition is desired, if the current lift state 72 is still the low-lift state or has become the low-lift state, the next cylinder (cylinder ID) to perform intake charge is identified at 170, a minimum and maximum angular position allowable for transitioning to the next lift state are determined at 190, and the minimum and maximum are evaluated at 200 and 210. The minimum and maximum define a range at which the transition can take place. The range is adjusted by the estimated total time delay 68 (e.g., subtracting the total time delay from the minimum and the maximum). If the current crankshaft position is outside of the adjusted range for that cylinder, the transition is not made. If the current crankshaft position is within the adjusted range for that cylinder at 200 and 210, the appropriate solenoid operated valve 42 (FIG. 1) is selected at 220, the state is transitioned at 230, and torque smoothing is commanded at 240.

The method continues to transition the state for each cylinder until all solenoid operated valves 42 (FIG. 1) have transitioned. Once all solenoid operated valves 42 (FIG. 1) have transitioned at 250, the method may end at 260. Otherwise, the method continues at 180 by incrementing the cylinder ID and evaluating the minimum and maximums at 190, 200, and 210.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A system for controlling a variable valve lift system of an engine, comprising:
   a delay module that estimates a total delay based on at least one of a measured and an estimated delay of the variable valve lift system; and
   a variable valve control module that commands one of a first transition from a variable valve low-lift profile to a variable valve high-lift profile and a second transition from a variable valve high-lift profile to a variable valve low-lift profile based on the total delay,
   wherein the variable valve control module commands the first transition and the second transition based on a range of crankshaft angular positions that is adjusted based on the total delay, and
   wherein the range is defined by a maximum crankshaft angular position and a minimum crankshaft angular position, and wherein the variable valve control module adjusts the range by subtracting the total delay from at least one of the maximum crankshaft angular position and the minimum crankshaft angular position.

2. The system of claim 1 further comprising an engine control module that controls one of throttle position, spark timing, and camshaft phaser movement based on the first transition from the variable valve low-lift profile to the variable valve high-lift profile.

3. The system of claim 2 wherein the engine control module adjusts the control of the at least one of the throttle position, the spark timing, and the camshaft phaser movement prior to the first transition from the variable valve low-lift profile to the variable valve high-lift profile.

4. The system of claim 1 further comprising an engine control module that controls engine torque based on the second transition from the variable valve high-lift profile to the variable valve low-lift profile.

5. The system of claim 4 wherein the engine control module controls engine torque after the second transition from the variable valve high-lift profile to the variable valve low-lift profile.

6. The system of claim 1 wherein the variable valve control module commands the first transition from the variable valve low-lift profile to the variable valve high-lift profile and the second transition from the variable valve high-lift profile to the variable valve low-lift profile based on a desired engine torque.

7. A method of controlling a variable valve lift system of an engine, comprising:
   estimating a total delay based on at least one of a measured and an estimated delay of the variable valve lift system; and
   commanding one of a first transition from a variable valve low-lift profile to a variable valve high-lift profile and a second transition from a variable valve high-lift profile to a variable valve low-lift profile based on the total delay, wherein the estimating comprises:
computing the total delay as a summation of at least one of measured and estimated delays of the variable valve lift system; and
converting the total delay to degrees of crankshaft rotation, and
wherein the commanding the first transition from the variable valve low-lift profile to the variable valve high-lift profile and the second transition from a variable valve high-lift profile to the variable valve low-lift profile is based on the converted total delay.

8. The method of claim 7 wherein the commanding comprises commanding the one of the first transition from the variable valve low-lift profile to the variable valve high-lift profile and the second transition from the variable valve high-lift profile to the variable valve low-lift profile based on a range of crankshaft angular positions that is adjusted based on the total delay.

9. The method of claim 8 further comprising adjusting the range of crankshaft angular positions by subtracting the total delay from at least one of a maximum crankshaft angular position and a minimum crankshaft angular position.

10. The method of claim 8 wherein the adjusting the range of crankshaft angular positions is performed per cylinder of the engine.

11. The method of claim 7 further comprising controlling at least one of throttle position, spark timing, and camshaft phaser movement based on the first transition from the variable valve low-lift profile to the variable valve high-lift profile.

12. The method of claim 11 wherein the controlling the at least one of the throttle position, the spark timing, and the camshaft phaser movement occurs prior to the commanding the first transition from the variable valve low-lift profile to the variable valve high-lift profile.

13. The method of claim 7 further comprising controlling engine torque based on the second transition from the variable valve high-lift profile to the variable valve low-lift profile.

14. The method of claim 13 wherein the performing comprises controlling engine torque after the commanding the second transition from the variable valve high-lift profile to the variable valve low-lift profile.

15. The method of claim 7 wherein the commanding comprises commanding the first transition from the variable valve low-lift profile to the variable valve high-lift profile and the second transition from the variable valve high-lift profile to the variable valve low-lift profile based on a desired engine torque.

16. The method of claim 7 wherein the converting the total delay ($t_{delay}$) to degrees of crankshaft rotation ($Deg_{delay}$) is based on engine speed (RPM) and the following equation:

$$Deg_{delay} = 360 * \left[ \frac{RPM}{120} (t_{delay})^2 + \frac{RPM}{60} (t_{delay}) \right].$$

17. The method of claim 7 wherein the estimating the total delay is based on a solenoid time delay determined as a function of volume and fluid temperature.

18. The method of claim 7 wherein the estimating the total delay is based on a control pressure rise time delay determined as a function of fluid supply pressure and fluid temperature.

19. The method of claim 7 wherein the estimating the total delay is based on an actuator time delay determined as a function of control pressure and fluid temperature.

20. A method of controlling a variable valve lift system of an engine, comprising:
estimating a total delay based on at least one of a measured and an estimated delay of the variable valve lift system;
commanding one of a first transition from a variable valve low-lift profile to a variable valve high-lift profile and a second transition from a variable valve high-lift profile to a variable valve low-lift profile based on the total delay,
wherein the commanding comprises commanding the one of the first transition from the variable valve low-lift profile to the variable valve high-lift profile and the second transition from the variable valve high-lift profile to the variable valve low-lift profile based on a range of crankshaft angular positions that is adjusted based on the total delay; and
adjusting the range of crankshaft angular positions by subtracting the total delay from at least one of a maximum crankshaft angular position and a minimum crankshaft angular position.

21. A method of controlling a variable valve lift system of an engine, comprising:
estimating a total delay based on at least one of a measured and an estimated delay of the variable valve lift system; and
commanding one of a first transition from a variable valve low-lift profile to a variable valve high-lift profile and a second transition from a variable valve high-lift profile to a variable valve low-lift profile based on the total delay,
wherein the estimating the total delay is based on a solenoid time delay determined as a function of volume and fluid temperature.

22. A method of controlling a variable valve lift system of an engine, comprising:
estimating a total delay based on at least one of a measured and an estimated delay of the variable valve lift system; and
commanding one of a first transition from a variable valve low-lift profile to a variable valve high-lift profile and a second transition from a variable valve high-lift profile to a variable valve low-lift profile based on the total delay,
wherein the estimating the total delay is based on a control pressure rise time delay determined as a function of fluid supply pressure and fluid temperature.

* * * * *